(12) United States Patent
Arguello

(10) Patent No.: US 10,898,294 B2
(45) Date of Patent: Jan. 26, 2021

(54) TAIL CAP FOR DENTAL EQUIPMENT

(71) Applicant: Stoma Ventures, LLC, St. Louis, MO (US)

(72) Inventor: Edward Arguello, Weston, FL (US)

(73) Assignee: STOMA VENTURES, LLC, Chesterfield, MO (US)

( * ) Notice: Subject to any disclaimer, the term of this patent is extended or adjusted under 35 U.S.C. 154(b) by 167 days.

(21) Appl. No.: 14/977,949

(22) Filed: Dec. 22, 2015

(65) Prior Publication Data
US 2017/0172703 A1   Jun. 22, 2017

(51) Int. Cl.
*A61C 1/16* (2006.01)
*B65D 39/00* (2006.01)
*A61C 17/08* (2006.01)

(52) U.S. Cl.
CPC ............... *A61C 1/16* (2013.01); *A61C 17/08* (2019.05); *B65D 39/0005* (2013.01); *B65D 39/0041* (2013.01); *B65D 2251/08* (2013.01)

(58) Field of Classification Search
CPC ........ A47G 2019/122; A47G 2019/125; A47G 21/18; A47G 19/22; A61C 1/16; A61C 1/0061; A61C 17/04; A61C 17/043; B65D 2543/00046; B65D 2543/00296; B65D 2543/00092; B65D 47/06; B65D 47/0842; B65D 47/121; B65D 59/02; B65D 39/0029; B65D 39/0005; B65D 39/0041; B65D 2251/08; F16L 55/11; F16L 55/1141; F16L 55/115
USPC ............. 215/50–51, 54, 200, 316, 320, 355; 220/203.13, 780, 787, 789, 800–801; 222/519–521, 544–546, 554, 563
See application file for complete search history.

(56) References Cited

U.S. PATENT DOCUMENTS

| | | | | |
|---|---|---|---|---|
| 1,455,978 | A * | 5/1923 | Wentz | B65D 39/12 215/215 |
| 1,937,674 | A * | 12/1933 | Teason | B65D 35/42 220/291 |
| 2,663,451 | A * | 12/1953 | Yarnall | B65D 39/0023 220/805 |
| D198,875 | S * | 8/1964 | Amelio | B65D 35/42 D9/446 |
| 3,147,824 | A * | 9/1964 | Henderson | F16N 21/06 116/216 |

(Continued)

OTHER PUBLICATIONS

"Stepped Grommets." BMP-TAPPI®. Oct. 28, 2012. Accessed Feb. 14, 2018. https://www.bmp-tappi.com/portfolio_item/stepped-grommets.*

(Continued)

*Primary Examiner* — Chun Hoi Cheung
*Assistant Examiner* — Brijesh V. Patel
(74) *Attorney, Agent, or Firm* — David H. Chervitz

(57) ABSTRACT

A tail cap is disclosed having a body portion having a top side and a bottom side with the bottom side having a first plug portion and a second plug portion, a pull, and a central portion connected between the body portion and the pull. Another tail cap is disclosed having a body portion having a top side and a bottom side with the bottom side having a first plug portion and a second plug portion and the top side having a third plug portion and a fourth plug portion, a pull, and a central portion connected between the body portion and the pull.

20 Claims, 10 Drawing Sheets

(56) References Cited

U.S. PATENT DOCUMENTS

| | | | | |
|---|---|---|---|---|
| 3,247,998 A * | 4/1966 | Tantlinger | B60T 17/046 | 220/375 |
| 3,379,327 A * | 4/1968 | Link | B65D 41/485 | 215/305 |
| 3,578,027 A * | 5/1971 | Zopfi | F16L 55/1141 | 138/89 |
| 3,659,738 A * | 5/1972 | Friedmann | B65D 51/007 | 220/287 |
| 3,664,541 A * | 5/1972 | Ruskin | B65D 51/007 | 220/791 |
| D228,887 S * | 10/1973 | Gedell | | 220/375 |
| 3,807,595 A * | 4/1974 | Zundel | B65D 17/506 | 220/260 |
| 3,898,046 A * | 8/1975 | Ikeda | B01L 3/50825 | 215/355 |
| 4,060,100 A * | 11/1977 | Miller | F16L 55/11 | 138/89 |
| D260,373 S * | 8/1981 | Wood | | D9/446 |
| 4,318,495 A * | 3/1982 | Wood | B65D 55/16 | 220/375 |
| 4,640,434 A * | 2/1987 | Johnsen | B64D 37/00 | 220/287 |
| 4,940,135 A * | 7/1990 | Hall | F41A 9/72 | 206/3 |
| 5,144,972 A * | 9/1992 | Dryden | A61M 39/20 | 137/15.18 |
| 5,150,528 A * | 9/1992 | Shire | G02B 23/16 | 220/375 |
| 5,195,561 A * | 3/1993 | Wilson | B60C 29/06 | 138/89.2 |
| D350,268 S * | 9/1994 | Grimm | | D8/70 |
| 5,496,141 A * | 3/1996 | Popsys | B65D 39/0023 | 138/89 |
| 5,605,241 A * | 2/1997 | Imperioli | B65D 47/2068 | 215/306 |
| 5,842,594 A * | 12/1998 | Ibara | B65D 51/007 | 220/314 |
| D404,646 S * | 1/1999 | Black, Sr. | | D9/440 |
| D435,444 S * | 12/2000 | Newville | | D9/446 |
| 6,435,362 B1 * | 8/2002 | Dekorti | B65D 39/16 | 215/296 |
| D514,935 S * | 2/2006 | Sturk | | D9/449 |
| 7,175,042 B2 * | 2/2007 | Durdon | B65D 47/0842 | 220/254.3 |
| D541,943 S * | 5/2007 | Stewart | | D24/199 |
| 7,232,428 B1 * | 6/2007 | Inukai | A61M 39/02 | 604/248 |
| 7,374,357 B2 * | 5/2008 | Takahashi | A61C 5/66 | 215/296 |
| 7,490,629 B2 * | 2/2009 | Williams | F16L 55/1141 | 138/89 |
| 7,905,068 B2 * | 3/2011 | Waters, Jr. | E04C 5/20 | 52/301 |
| 8,123,086 B2 * | 2/2012 | Haley | B65D 47/06 | 215/309 |
| 8,261,927 B1 * | 9/2012 | Volzke | B65D 39/0041 | 220/287 |
| 8,733,584 B2 * | 5/2014 | Auzenne | B65D 39/0005 | 215/230 |
| 8,783,486 B1 * | 7/2014 | Hoyt | B65D 79/005 | 215/355 |
| 8,833,398 B2 * | 9/2014 | Williams | F16L 55/11 | 138/89 |
| D714,641 S * | 10/2014 | Hodge | | D9/446 |
| 9,133,934 B2 * | 9/2015 | Yoneda | F16J 15/02 | |
| D753,998 S * | 4/2016 | Murphey | | D9/446 |
| D786,345 S * | 5/2017 | Kimura | | D18/56 |
| 2003/0024930 A1 * | 2/2003 | Smith | B65D 47/141 | 220/254.1 |
| 2004/0094549 A1 * | 5/2004 | Ryan | B65D 47/121 | 220/254.1 |
| 2005/0199631 A1 * | 9/2005 | Alois | B65D 39/0005 | 220/375 |
| 2006/0201945 A1 * | 9/2006 | Tedford, Jr. | B65D 47/286 | 220/254.9 |
| 2007/0012709 A1 * | 1/2007 | Durdon | B65D 43/0212 | 220/791 |
| 2010/0096398 A1 * | 4/2010 | Gorskey | B65D 47/06 | 220/793 |
| 2014/0170595 A1 | 6/2014 | Williams et al. | | |
| 2014/0239551 A1 | 8/2014 | Williams et al. | | |
| 2015/0320638 A1 * | 11/2015 | Becker | A61J 1/1475 | 215/306 |
| 2017/0113160 A1 * | 4/2017 | Kremerman | B01L 3/565 | |

OTHER PUBLICATIONS

"Pression plug with 1 insert." BMP-TAPPI ®. Oct. 28, 2012. Accessed Feb. 14, 2018. https://www.bmp-tappi.com/portfolio_item/pression-plug-with-1-insert.*

"Pression plug with 2 inserts." BMP-TAPPI ®. Oct. 26, 2012. Accessed Feb. 14, 2018. https://www.bmp-tappi.com/portfolio_item/pression-plug-with-2-inserts.*

"Pression plug." BMP-TAPPI ®. Oct. 26, 2012. Accessed Feb. 14, 2018. https://www.bmp-tappi.com/portfolio_item/pression-plug.*

* cited by examiner

TAIL CAP FOR DENTAL EQUIPMENT

BACKGROUND

This disclosure relates to a tail cap for dental equipment and more particularly to a tiered tail cap that may be used with dental equipment of various sizes.

During a dental procedure it is important to be able to remove saliva, blood, water, tooth fragments, metals, and other debris or fluids from the mouth of a patient. Removal of this matter allows a dentist to be able to perform a procedure in an unobstructed manner. Various systems or devices have been developed to remove liquid and solid materials from a mouth during a dental procedure. One device that is capable of removing saliva is known as a saliva ejector or a low volume ejector. A saliva ejector typically comprises a plastic flexible tube for placement in the mouth of a patient. The saliva ejector tube is connected to a valve which in turn is connected via suction tubing to a source of vacuum. In this manner, saliva is passed through the ejector tube, the valve, and the tubing to be disposed of in a sanitary manner. Some other systems include a tailpiece between the tubing and the valve. The tailpiece is used to better secure the valve to the tubing Once the procedure is completed, the ejector should be discarded and the valve should be sterilized by autoclaving to be used again. Although it is suggested to autoclave the valve after each use, it is known that autoclaving is hardly ever done. Another device that is capable of removing solid materials is a high volume evacuator system. A high volume evacuator system generally consists of a tube that may be inserted into a mouth of a patient with the tube connected to a valve which is connected via a tubing to a source of vacuum. Again, in this manner, debris may be removed from the mouth of the patient. Some other systems include a tailpiece between the tubing and the valve. The tailpiece is used to better secure the valve to the tubing. After the dental procedure, the tube is disposed of and the valve should be sterilized for reuse. However, although it is suggested to sterilize the valve after use, it is known that this suggested procedure is hardly ever followed.

As can be appreciated, the saliva ejector and the high volume evacuator are used to remove liquids and debris from a mouth of a patient to prevent a patient from swallowing or aspirating liquids and debris produced during a dental procedure. Once the procedure is completed, the saliva ejector and its associated valve or the high volume evacuator and its associated valve should be removed from the suction tubing connected to the vacuum source for disposal of the saliva ejector or the high volume evacuator and sterilization of associated valves. However, when these devices are removed from the suction tubing, a great deal of noise is generated by the vacuum source. In order to silence this noise a tail cap may be inserted into the tailpiece or into the suction tubing. Although tail caps are useful, due to the different sizes of the tailpieces and suction tubing multiple sized tail caps are required to plug the different sized tailpieces. For example, the tailpiece or suction tubing used in conjunction with the saliva ejector is smaller in size or diameter than the tailpiece or suction tubing used in conjunction with the high volume evacuator. Due to this, two different sized tail caps are required to be used to stopper the tubing.

Therefore, it would be desirable to have a single tail cap that is capable of plugging different sizes of tail pieces or suction tubing. It would also be desirable to have a tail cap that is easy to install on or remove from tail pieces or suction tubing connected to a source of vacuum. Further, it would be advantageous to have a tail cap that is disposable.

BRIEF SUMMARY

In one form of the present disclosure, a tail cap comprises a body portion having a top side and a bottom side with the bottom side having a first plug portion and a second plug portion, a pull, and a central portion connected between the body portion and the pull.

In another form of the present disclosure, a tail cap comprises a body portion having a top side and a bottom side with the bottom side having a first plug portion and a second plug portion and the top side having a third plug portion and a fourth plug portion, a pull, and a central portion connected between the body portion and the pull.

In yet another form of the present disclosure, a tail cap comprises a body portion having a top side and a bottom side with the bottom side having a first circular tiered plug portion and a second circular tiered plug portion, a pull, and a central portion connected between the body portion and the pull.

The present disclosure provides a tail cap for use with a dental instrument that is suitable for one time use and may be discarded after a single use.

The present disclosure provides a tail cap that is easy to install on and remove from suction tubing connected to a source of vacuum.

The present disclosure provides a tail cap that is small, lightweight, easy to handle, easy to install, and easy to operate.

The present disclosure also provides a tail cap which is of simple construction and design and which can be easily employed with highly reliable results.

The present disclosure is related to a tail cap that does not require sterilization and prevents against and cross-contamination.

The present disclosure provides a tail cap that may have an antimicrobial agent or chemical incorporated into the tail cap to prevent any bacterial growth on the tail cap. The antimicrobial agent or chemical may also be a coating applied to the tail cap.

The present disclosure is related to a tail cap that may be constructed of a recyclable or biodegradable material to reduce the cost of the tail cap and to allow the tail cap to be disposable and discarded after a single use.

The present disclosure provides a tail cap that may be used to cap off a suction tubing connected to a source of vacuum when a dental valve device is removed from the suction tubing connected to the source of vacuum to reduce or eliminate any sound or noise associated with the source of vacuum.

The present disclosure is related to a tail cap that has more than one sealing body that is easy to manipulate to open or close an opening of a suction tubing.

These and other advantages of the present disclosure will become apparent after considering the following detailed specification in conjunction with the accompanying drawings, wherein:

DETAILED DESCRIPTION OF PREFERRED EMBODIMENTS

Figure 1:
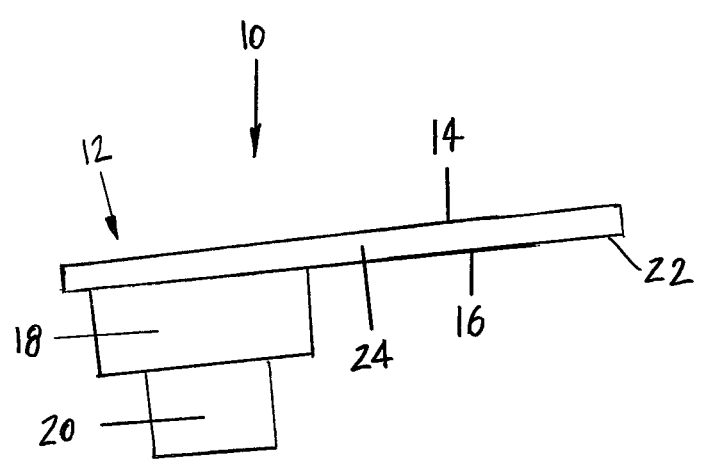
FIG. 1 is a side perspective view of a tail cap constructed according to the present disclosure.

Referring now to the drawings, wherein like numbers refer to like items, number 10 identifies a tail cap for use with dental equipment (not shown) constructed according to the present disclosure. With reference now to FIG. 1, the tail cap 10 comprises a body portion 12 having a top side 14 and a bottom side 16 with the bottom side 16 having a first plug portion 18 and a second plug portion 20, a pull 22, and a central portion 24 connected between the body portion 12 and the pull 22. The body portion 12 is wider than the first plug portion 18 and the first plug portion 18 is wider than the second plug portion 20 which provides a tiered configuration to the tail cap 10. As can be appreciated, the first plug portion 18 is wider for being capable of being inserted into a tailpiece or suction tubing to plug the tailpiece or suction tubing to silence any noise being generated by a vacuum system, as will be explained more fully herein. The second plug portion 20 is narrower or has a diameter less than a diameter of the first plug portion 18 to be able to be inserted into a smaller sized tailpiece or suction tubing.

Figure 2:
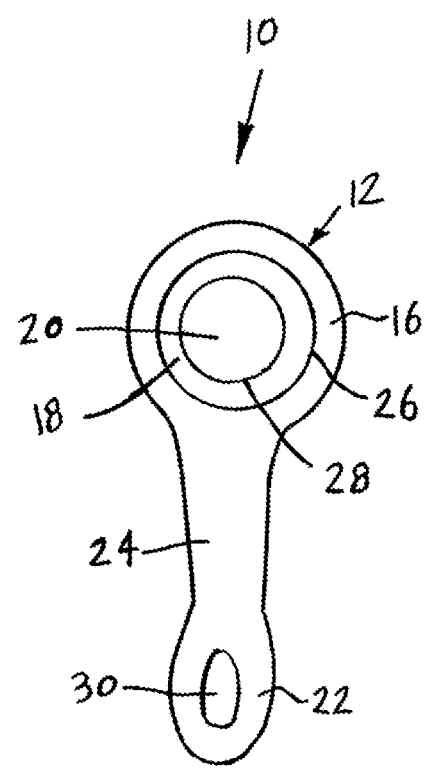
FIG. 2 is a bottom view of the tail cap shown in FIG. 1 constructed according to the present disclosure.

FIG. 2 illustrates a bottom view of the tail cap 10. The tail cap 10 has the first plug portion 18 on the bottom side 16 and the second plug portion 20 on the first plug portion 18. The first plug portion 18 has a first diameter 26 and the second plug portion 20 has a second diameter 28. The first diameter 26 is greater than the second diameter 28. The second plug portion 20 is concentric or coaxial with the first plug portion 18. The first plug portion 18 and the second plug portion 20 form a circular tiered configuration. The central portion 24 is connected between the body portion 12 and the pull 22. The pull 22 has a central indentation 30 to facilitate grasping of the tail cap 10. Although the plug portions 18 and 20 are shown as being circular in shape, it is possible that the plug portions 18 and 20 may take on other shapes as needed. By way of example only, the plug portions 18 and 20 may be oval or rectangular in shape.

Figure 3:
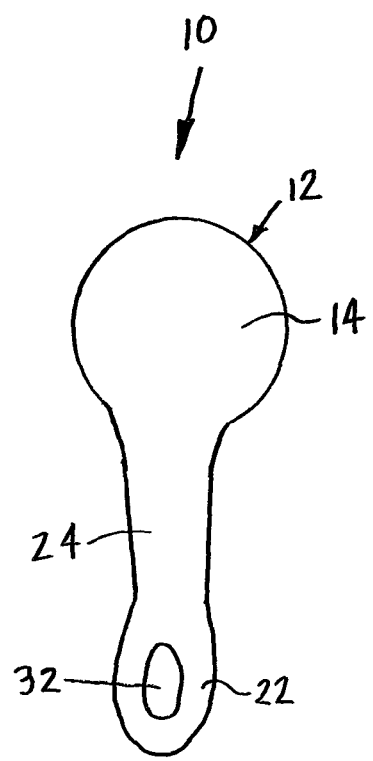
FIG. 3 is a top view of the tail cap shown in FIG. 1 constructed according to the present disclosure.

Referring now to FIG. 3, a top view of the tail cap 10 is shown. The tail cap 10 has the body portion 12, the top side 14, the pull 22, and the central portion 24. The pull 22 has a central indentation 32. As can be appreciated, the central indentations 30 (FIG. 2) and 32 assist in grasping the pull 22. The body portion 12 is greater in diameter than the first diameter 26 and the second diameter 28 in that neither of the plug portions 18 and 20 can be viewed from the top side 14.

The body portion 12 and the pull 22 are shown being rounded in shape, however, other shapes are possible and contemplated.

Figure 4:
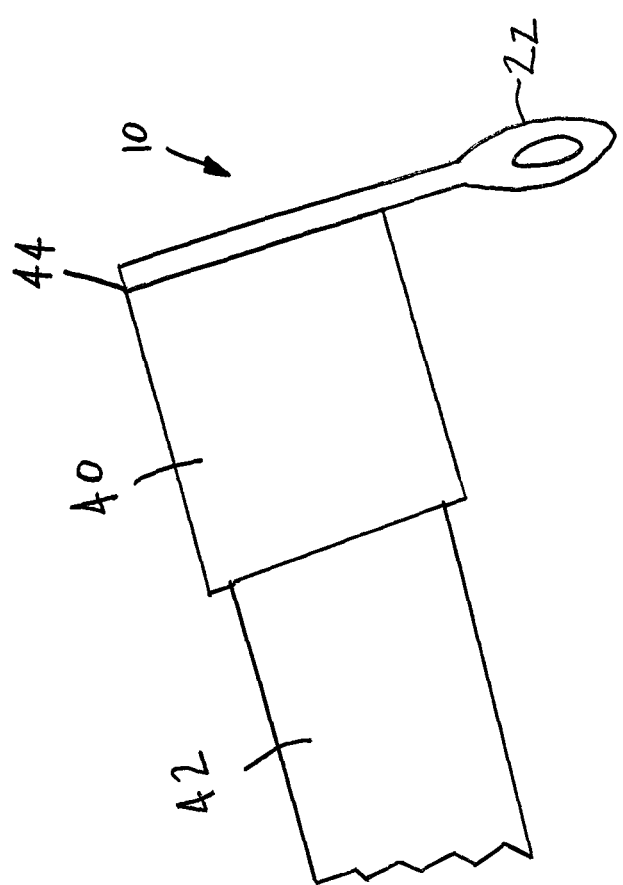
FIG. 4 is a side perspective view of the tail cap shown in FIG. 1 inserted into a tailpiece connected to a section of suction hosing sized for a high volume evacuator.

FIG. 4 shows the tail cap 10 being inserted into a tailpiece 40 that is used to receive a high volume ejector valve (not shown). The tailpiece 40 is in turn connected to suction hosing 42. The suction hosing 42 is connected to a vacuum system (not shown) that is used to provide a source of vacuum to remove debris from a mouth of a patient during a dental procedure. The tailpiece 40 is wide enough so that the first plug portion 18, which is obscured in this view, covers an opening 44 of the tailpiece 40. In this manner, the tail cap 10 plugs the opening 44 and any noise generated by the vacuum system is silenced. The pull 22 extends away from the opening 44 and provides a portion of the tail cap 10 to grasp when the tail cap 10 needs to be removed from the opening 44.

Figure 5:
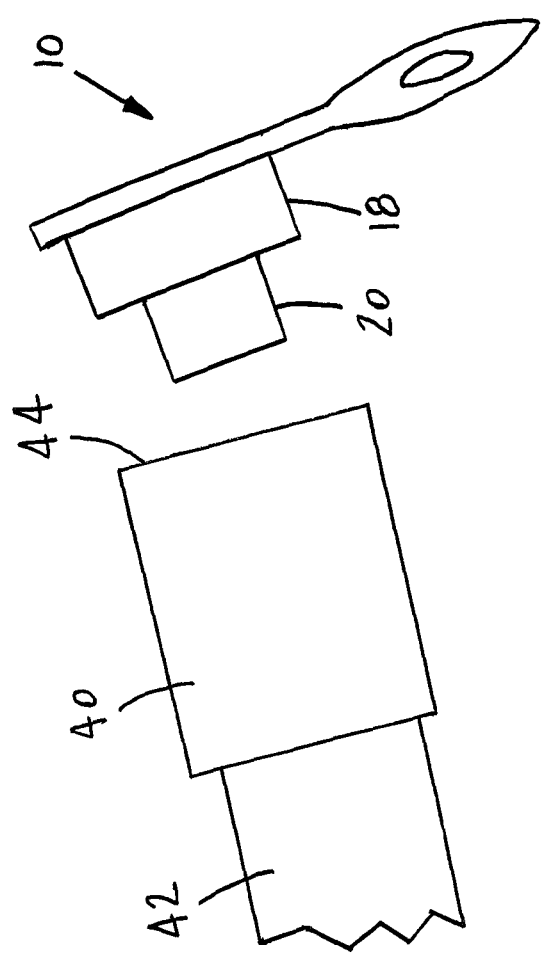
FIG. 5 is a side perspective view of the tail cap shown in FIG. 4 being removed from the tailpiece connected to the section of suction hosing sized for a high volume evacuator.

With reference now to FIG. 5, the tail cap 10 has been removed from the opening 44 of the tailpiece 40. The second plug portion 20 is not wide enough to plug the opening 44. The first plug portion 18 is wide enough to cover or plug the opening 44.

Figure 6:
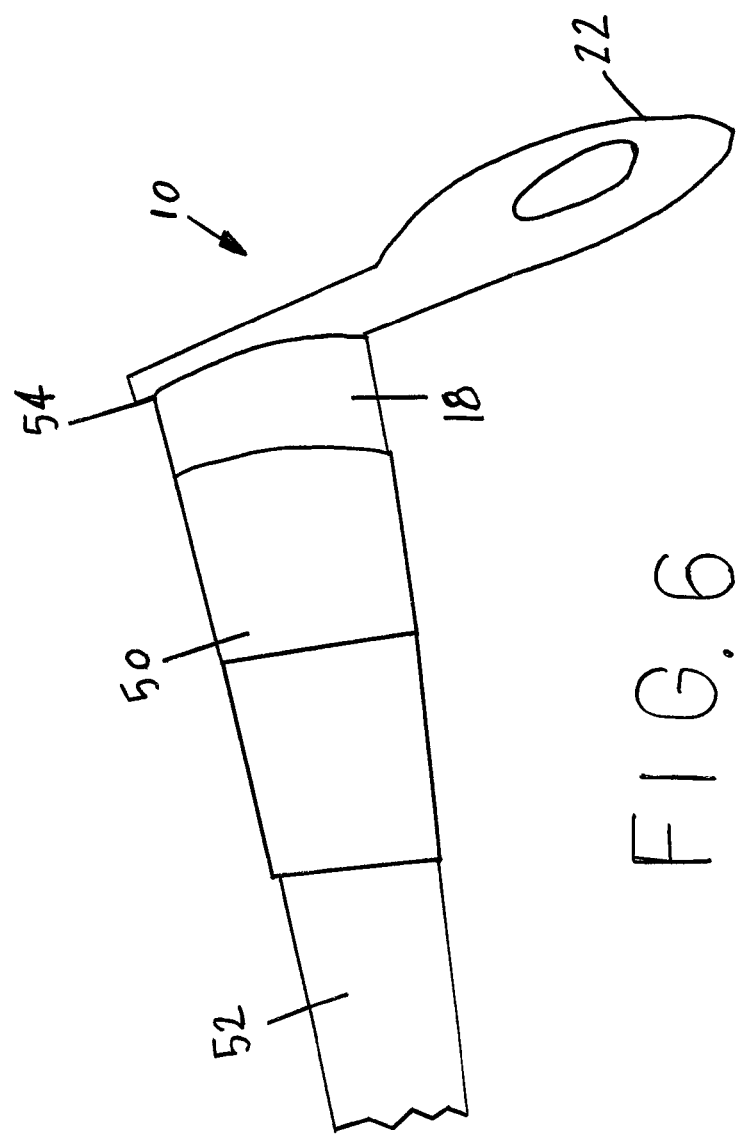
FIG. 6 is a side perspective view of the tail cap shown in FIG. 1 inserted into a tailpiece connected to a section of suction hosing sized for a saliva ejector.

FIG. 6 depicts the tail cap 10 being inserted into a tailpiece 50 that is used to receive a saliva ejector valve (not shown). The tailpiece 50 is in turn connected to suction hosing 52. The suction hosing 52 is connected to a vacuum system (not shown) that is used to provide a source of vacuum to remove saliva from a mouth of a patient during a dental procedure. The tailpiece 50 is wide enough so that only the second plug portion 20, which is hidden in this view, covers an opening 54 of the tailpiece 50. In this manner, the tail cap 10 plugs the opening 54 and any noise generated by the vacuum system is muted or silenced. The pull 22 also extends away from the opening 54 and provides a portion of the tail cap 10 to grasp to remove the tail cap 10 from the opening 54.

Figure 7:
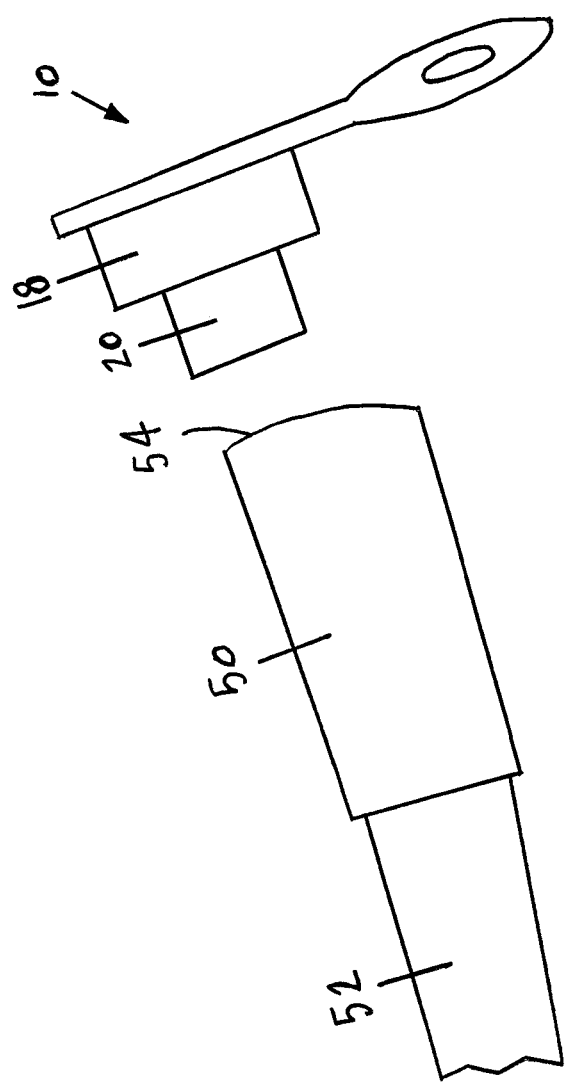
FIG. 7 is a side perspective view of the tail cap shown in FIG. 6 being removed from the tailpiece connected to the section of suction hosing sized for a saliva ejector.

With reference now to FIG. 7, the tail cap 10 has been removed from the opening 54 of the tailpiece 50. The second plug portion 20 is wide enough to plug the opening 54. The first plug portion 18 is too wide to plug the opening 54 and will not fit into the opening 54.

In operation of the tail cap 10, once a dental procedure or operation has been completed, a dental valve device (not shown) is easily separated from the tailpiece 40 or 50, and the tail cap 10 is placed into the opening 44 or 54. The tail cap 10 will block any air from being sucked into the tailpiece 40 or 50 and the hose 42 or 52 and this silences any noise that is generated by the source of vacuum or the suction system. In particular, the first plug portion 18 is used to cover the opening 44 and the second plug portion 20 is used to cover the opening 54. When a new dental procedure or operation is to be initiated, the tail cap 10 is removed from the opening 44 or 54 and the tail cap 10 may be disposed of by any suitable manner.

Figure 8:
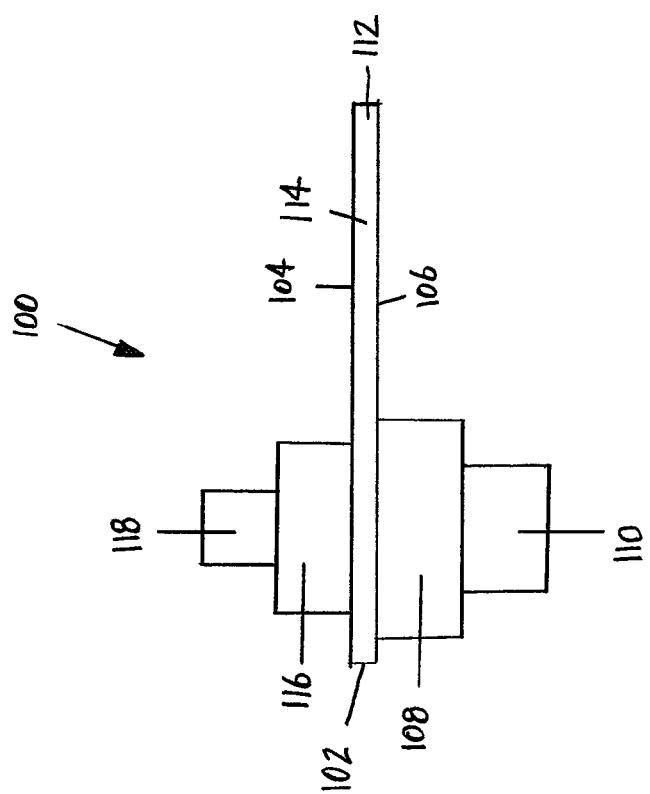
FIG. 8 is a side perspective view of another embodiment of a tail cap constructed according to the present disclosure.

FIG. 8 illustrates another embodiment of a tail cap 100 constructed according to the present disclosure. The tail cap 100 comprises a body portion 102 having a top side 104 and a bottom side 106 with the bottom side 106 having a first plug portion 108 and a second plug portion 110, a pull 112, and a central portion 114 connected between the body portion 102 and the pull 112. The first plug portion 108 is wider than the second plug portion 110. The top side 104 also has a third plug portion 116 and a fourth plug portion 118. The third plug portion 116 is wider than the fourth plug portion 118.

Figure 9:
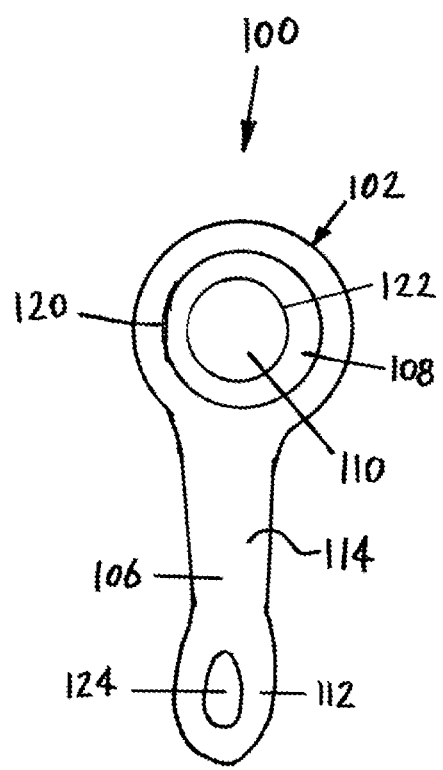
FIG. 9 is a bottom view of the tail cap shown in FIG. 8 constructed according to the present disclosure.

With reference to FIG. 9, a bottom view of the tail cap 100 is shown. The tail cap 100 has the first plug portion 108 on the bottom side 106 and the second plug portion 110 on the first plug portion 108. The first plug portion 108 has a first diameter 120 and the second plug portion 110 has a second diameter 122. The first diameter 120 is greater than the second diameter 122. The second plug portion 110 is concentric with the first plug portion 108. The first plug portion 108 and the second plug portion 110 form a circular tiered configuration. The central portion 114 is connected between the body portion 102 and the pull 112. The pull 112 has a central indentation 124.

Figure 10:
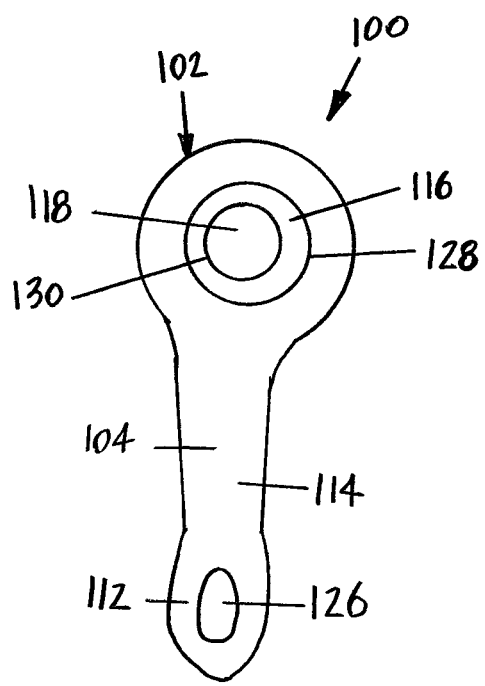
FIG. 10 is a top view of the tail cap shown in FIG. 8 constructed according to the present disclosure.

In FIG. 10, a top view of the tail cap 100 is shown. The tail cap 100 has the body portion 102, the top side 104, the third plug portion 116, the fourth plug portion 118, the pull 112, and the central portion 114. The pull 112 has a central indentation 126. The central indentations 124 (FIG. 9) and 126 assist in grasping the pull 112. The body portion 102 is greater in diameter than the first diameter 120 and the second diameter 122 in that neither of the plug portions 108 and 110 can be viewed from the top side 104. The body portion 102 and the pull 112 are shown being rounded in shape, however, other shapes are possible and contemplated. The third plug portion 116 has a third diameter 128 and the fourth plug portion 118 has a fourth diameter 130. The third diameter 128 is greater than the fourth diameter 130. The third plug portion 116 and the fourth plug portion 118 form a circular tiered configuration. The tail cap 100 may be used in circumstances where the suction hosing connected to the vacuum system does not have or require a tailpiece, such as the tailpieces 40 and 50, or the openings of other tailpieces are wider than the openings 44 and 54 and the third plug portion 116 or the fourth plug portion 118 would be a better fit. The third diameter 128 may be less than the first diameter 120 and the fourth diameter 130 may be less than the second diameter 122. The tail cap 100 can still be used to cover the openings 44 and 54 and may also be used to cover openings associated with suction hosing. By use of the tail cap 100 an opening of either a tailpiece or a suction hosing will be physically blocked to shut off any air from rushing into the tailpiece or suction hosing to silence any noise produced by the vacuum system. The pull 112 is used to be grasped by a hand to remove the plug portions 108, 110, 116, or 118 and the tail cap 100 from the tailpiece or hose when a new disposable dental valve device (not shown) is to be used.

In operation of the tail cap 100, once a dental procedure or operation has been completed, a dental valve device (not shown) is easily separated from the tailpiece 40 or 50, and the tail cap 100 is placed over the opening 44 or 54. The tail cap 100 will block any air from being sucked into the tailpiece 40 or 50 and the hose 42 or 52 and this silences any noise that is generated by the source of vacuum or the suction system. In particular, the first plug portion 108 is used to cover the opening 44 and the second plug portion 110 is used to cover the opening 54. When a new dental procedure or operation is to be initiated, the tail cap 100 is removed from the opening 44 or 54 and the tail cap 100 may be disposed of by any suitable manner. Also, in situations where the tailpiece 40 or 50 are not present, then the third plug portion 116 and the fourth plug portion 118 on the top side 104 of the tail cap 100 are used. The tail cap 100 may have a marking on the top side 104 to indicate that the third plug portion 116 and the fourth plug portion 118 may be used where only suction tubing is present and tailpieces 40 and 50 are not present. The tail cap 100 may also have a marking on the bottom side 106 to indicate that the first plug portion 108 and the second plug portion 110 are to be used when the tailpieces 40 and 50 are present.

The tail caps 10 and 100 may be formed of any suitable material such as rubber, plastic, polyethylene, and high density polyethylene or any other suitable material that is disposable and recyclable. Any suitable plastic may be used to construct the tail caps 10 and 100 so that the tail caps 10 and 100 may withstand use to block the opening of a tailpiece or suction tubing. It is also possible and contemplated to incorporate an antimicrobial agent or chemical in the plastic or to provide a coating of an antimicrobial agent on the plastic to prevent cross-contamination when using the tail caps 10 and 100. As can be appreciated, the antimicrobial agent may be incorporated into any of the component parts of the tail caps 10 and 100.

From all that has been said, it will be clear that there has thus been shown and described herein a tail cap which fulfills the various advantages sought therefore. It will become apparent to those skilled in the art, however, that many changes, modifications, variations, and other uses and applications of the subject tail cap are possible and contemplated. All changes, modifications, variations, and other uses and applications which do not depart from the spirit and scope of the disclosure are deemed to be covered by the disclosure, which is limited only by the claims which follow.

What is claimed is:

1. A dental tailpiece connected to a suction hosing and a tail cap comprising:
    the dental tailpiece having a front opening and a rear opening with the rear opening connected to the suction hosing;
    the tail cap having a body portion having a top side and a bottom side with the bottom side having a first plug portion and a second plug portion with the second plug portion extending out from the first plug portion, the first plug portion being wider than the second plug portion and the body portion being wider than the first plug portion, the second plug portion for fitting into the front opening of the tailpiece, a pull having a top side and a bottom side, and a central portion connected between the body portion and the pull.

2. The dental tailpiece connected to a suction hosing and the tail cap of claim 1 wherein the tail cap is constructed of rubber.

3. The dental tailpiece connected to a suction hosing and the tail cap of claim 1 wherein the tail cap is constructed of plastic.

4. The dental tailpiece connected to a suction hosing and the tail cap of claim 1 wherein the top side of the pull has a central indentation that does not extend through the pull.

5. The dental tailpiece connected to a suction hosing and the tail cap of claim 1 wherein the first plug portion has a first diameter and the second plug portion has a second diameter and the first diameter is greater than the second diameter.

6. The dental tailpiece connected to a suction hosing and the tail cap of claim 1 wherein the bottom side of the pull has a central indentation that does not extend through the pull.

7. The dental tailpiece connected to a suction hosing and the tail cap of claim 1 wherein the first plug portion is concentric with the second plug portion.

8. A dental tailpiece and a tail cap comprising:
    the dental tailpiece having a front opening and a rear opening with the rear opening adapted to be connected to a suction hosing;
    the tail cap having a body portion having a top side and a bottom side with the bottom side having a first plug portion and a second plug portion with the second plug portion extending out from the first plug portion, and the top side having a third plug portion and a fourth plug portion with the fourth plug portion extending out from the third plug portion, the first plug portion being wider than the second plug portion and the body portion being wider than the first plug portion, the second plug portion for fitting into the front opening of the tailpiece, a pull having a top side and a bottom side, and a central portion connected between the body portion and the pull.

9. The dental tailpiece and the tail cap of claim 8 wherein the tail cap is constructed of rubber.

10. The dental tailpiece and the tail cap of claim 8 wherein the tail cap is constructed of plastic.

11. The dental tailpiece and the tail cap of claim 8 wherein the top side of the pull has a central indentation that does not extend through the pull.

12. The dental tailpiece and the tail cap of claim 8 wherein the first plug portion has a first diameter and the second plug portion has a second diameter and the first diameter is greater than the second diameter.

13. The dental tailpiece and the tail cap of claim 8 wherein the third plug portion has a third diameter and the fourth plug portion has a fourth diameter and the third diameter is greater than the fourth diameter.

14. The dental tailpiece and the tail cap of claim 8 wherein the first plug portion has a first diameter, the second plug portion has a second diameter, the third plug portion has a third diameter, and the fourth plug portion has a fourth diameter and the first diameter is greater than the third diameter.

15. The dental tailpiece and the tail cap of claim 8 wherein the first plug portion has a first diameter, the second plug portion has a second diameter, the third plug portion has a third diameter, and the fourth plug portion has a fourth diameter and the second diameter is greater than the fourth diameter.

16. The dental tailpiece and the tail cap of claim 8 wherein the bottom side of the pull has a central indentation that does not extend through the pull.

17. A dental tailpiece connected to a suction hosing and the tail cap comprising:

the dental tailpiece having a front opening and a rear opening with the rear opening connected to the suction hosing;

the tail cap having a body portion having a top side and a bottom side with the bottom side having a first circular tiered plug portion and a second circular tiered plug portion with the second circular tiered plug portion extending out from the first circular tiered plug portion, the first circular tiered plug portion being wider than the second circular tiered plug portion and the body portion being wider than the first circular tiered plug portion, the second circular tiered plug portion for fitting into the front opening of the tailpiece, a pull having a top side and a bottom side, and a central portion connected between the body portion and the pull.

18. The dental tailpiece connected to a suction hosing and the tail cap of claim 17 wherein the first circular tiered plug portion has a first diameter and the second circular tiered plug portion has a second diameter and the first diameter is greater than the second diameter.

19. The dental tailpiece connected to a suction hosing and the tail cap of claim 17 wherein the first circular tiered plug portion is wider than the second circular tiered plug portion.

20. The dental tailpiece connected to a suction hosing and the tail cap of claim 17 wherein the first circular tiered plug portion fits into the front opening of the tailpiece.

\* \* \* \* \*